(12) United States Patent
Udding et al.

(10) Patent No.: US 7,166,670 B2
(45) Date of Patent: *Jan. 23, 2007

(54) TWO-COMPONENT CHEMICAL FASTENING SYSTEMS

(75) Inventors: Jan H Udding, Zwolle (NL); Agnes E Wolters, Laag Zuthem (NL); Heinz Wilhelm, Hassloch (DE); Armin Pfeil, Kaufering (DE); Thomas Bürgel, Landsberg (DE); Lutz Sager, Scheuring (DE)

(73) Assignee: DSM IP Assets B.V., Te Heerlen (NL)

( * ) Notice: Subject to any disclaimer, the term of this patent is extended or adjusted under 35 U.S.C. 154(b) by 252 days.

This patent is subject to a terminal disclaimer.

(21) Appl. No.: 10/451,103

(22) PCT Filed: Dec. 19, 2001

(86) PCT No.: PCT/NL01/00923

§ 371 (c)(1),
(2), (4) Date: Nov. 13, 2003

(87) PCT Pub. No.: WO02/051896

PCT Pub. Date: Jul. 4, 2002

(65) Prior Publication Data

US 2004/0068044 A1    Apr. 8, 2004

(30) Foreign Application Priority Data

Dec. 22, 2000    (EP) .................................. 00204744

(51) Int. Cl.
C08L 35/08    (2006.01)
(52) U.S. Cl. ........................ 525/44; 525/27; 525/263
(58) Field of Classification Search ................ 525/44, 525/27, 263
See application file for complete search history.

(56) References Cited

U.S. PATENT DOCUMENTS

| | | | |
|---|---|---|---|
| 3,721,722 A | 3/1973 | Baum | |
| 3,876,726 A | 4/1975 | Ford, Jr. et al. | |
| 4,130,501 A | 12/1978 | Lutz et al. | |
| 4,944,819 A * | 7/1990 | Gebauer .................. | 156/78 |
| 5,157,072 A | 10/1992 | Hense et al. | |
| 5,304,649 A * | 4/1994 | Sanchez et al. ........... | 546/242 |
| 5,470,897 A | 11/1995 | Meixner et al. | |
| 6,054,502 A * | 4/2000 | Friedlander et al. ......... | 522/96 |
| 2004/0068044 A1 | 4/2004 | Udding et al. | |
| 2004/0072954 A1* | 4/2004 | Udding et al. .............. | 525/242 |

FOREIGN PATENT DOCUMENTS

| | | |
|---|---|---|
| DE | 32 26 602 | 1/1984 |
| DE | 39 40 138 | 6/1991 |
| DE | 42 31 161 | 3/1994 |
| DE | 43 04 824 | 8/1994 |
| EP | 0 028 841 | 5/1981 |
| EP | 0 322 808 | 7/1989 |
| EP | 0 432 087 | 6/1991 |
| EP | 0 534 197 | 3/1993 |
| EP | 0 534 201 | 3/1993 |
| EP | 534 197 | 3/1993 |
| EP | 0 591 803 | 4/1994 |
| GB | 915009 | * 1/1963 |
| JP | 09-059329 | 9/1998 |
| WO | 94 19 397 | 9/1994 |
| WO | 99/54403 | 10/1999 |

(Continued)

OTHER PUBLICATIONS

Derwent Publication, vol. 19, No. 97, "Curable resin composition with rapid curability for sealant or adhesive—comprises . . . "; Documentation Abstracts Journal A. Plastics.

(Continued)

*Primary Examiner*—David W. Wu
*Assistant Examiner*—Satya Sastri
(74) *Attorney, Agent, or Firm*—Nixon & Vanderhye, P.C.

(57) ABSTRACT

The invention relates to two-component chemical fastening systems, the A-component containing an unsaturated polyester and a reactive diluent, and the B-component containing a peroxide and an extender, wherein the extender is either a monomeric component according to formula 1

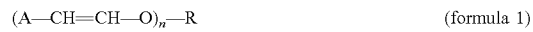

(A—CH=CH—O)$_n$—R    (formula 1)

or a resinous compound comprising, in a covalently built-in manner, a component having vinyl ether group(s), and the content of the peroxide in the B-component is from 0.5 to 99 wt. %. In the formula A, R and n are specified as hydrogen or $C_{1-3}$ alkyl; $C_{1-20}$ (hetero)-aliphatic with hydroxyl or amino groups, or poly($C_{2\ or\ 3}$)glycol with 2–120 glycol units; and 1 to 4, respectively.

The resinous compounds with built-in vinyl ether group(s) (0.5 to 50 wt. %, calculated as indicated) are obtained by reaction of a mixture of appropriate amounts of:
a) a first compound (HVE) containing at least one hydroxyl group and at least one vinyl ether group, and
b) a second compound (D/HIC), being an isocyanate; and
c) a third compound (G/P/HP) from (1) $C_{2-6}$ glycols, (2) $C_{5-20}$ polyols having 2–5 hydroxyl groups and (3) hydroxyl terminated polyester compounds, not being alkyd resins, having 1–5 free hydroxyl groups and 2–50 monomeric units, or mixtures thereof.

The invention also relates to methods for preparing (the B-component) of such two-component chemical fastening systems, as well as to use of the systems for chemical fastening.

16 Claims, No Drawings

FOREIGN PATENT DOCUMENTS

| WO | WO 99/54403 | 10/1999 |
| WO | 00 08 081 | 2/2000 |
| WO | 00/09478 | 2/2000 |
| WO | 00/78833 | 12/2000 |
| WO | WO 00/78833 | 12/2000 |

OTHER PUBLICATIONS

Derwent Publication, vol. 368, No. 46, "Use of vinyl ether as comonomer for unsaturated polyester resins—in peroxide cure systems as a non-carcinogenic substitute for styrene comonomers"; Dec. 10, 1994.

* cited by examiner

TWO-COMPONENT CHEMICAL FASTENING SYSTEMS

CROSS REFERENCE TO RELATED APPLICATION

This application is the National Phase of International Application PCT/NL01/00923 filed Dec. 19, 2001 which designated the U.S., and that International Application was published under PCT Article 21(2) in English.

This invention relates to improved two-component chemical fastening systems comprising a first component ("A-component") containing a diluted resin and, optionally, an accelerator and a second component ("B-component") containing a peroxide and an extender (which in fact is also a diluent) for the peroxide. For proper distinction between the diluents for the A-component and the B-component, respectively, the latter one is hereinafter referred to as extender. The invention further relates to methods for preparing such two-component chemical fastening systems, and to the use of such two-component systems for chemical fastening.

As used herein, the term "two-component system" refers to systems where two separate components (A and B) are being spatially separated from each other, for instance in separate cartridges or the like, and is intended to include any system wherein each of such two separate components (A and B) may consist of further separate components. The components are combined at the time the system is used for the chemical fastening.

Peroxides are generally being used as polymerization initiators in chemical fastening systems based on curable resin mortars, which are being hardened by the influence of the peroxide.

The A-component in commonly used resin mortars (also called chemical mortars) generally consists of unsaturated polyesters dissolved in reactive diluents like styrene or (meth)acrylic monomers, which act as comonomer in the hardening step of the chemical fastening process, and an accelerator. Unsaturated polyesters as meant herein form a class of (pre)polymers which besides the unsaturated polyesters as such, also includes vinyl esters, vinyl ester urethanes or mixtures of any of such products. In chemical fastening the peroxide is only needed in a small amount relative to the amount of A-component. Although the peroxide (or the peroxide composition) may be solid, proper mixing of the peroxide component (the B-component) with the A-component, however, usually requires that also the peroxide is more or less diluted) by the addition of another component (a diluent, which is often referred to as extender or carrier). Extenders for peroxides are compounds or compositions which are being used for enabling the peroxides to be suitably stored and handled, as free-flowing or pumpable products, before they are being used in chemical reactions. The peroxide compositions are then said to be extended. Only in such way a good mixing quality can be achieved for the A- and B-components, and forces needed to dispense the B-component from an injection system for such mixing into the A-component can be kept to a minimum.

In the past, as is, for instance disclosed in DE-3226602-A1 or EP-0432087-A1, various types of plasticizers, mainly dialkyl phthalates, have been used as extender for peroxides. Because of their properties as plasticizers, this type of components drastically impairs the mechanical performance of fastening systems where they are being used in the B-component. Additionally phthalates are considered to be critical to health, and for that reason they only should be used in very low quantities. As a consequence, when using phthalates as extender for the peroxides in the B-component, the mixing ratio (volume/volume) of A- and B-components is necessarily very high (i.e. at least 7:1 to 10:1). In such case any mixing fault also results in deterioration of the properties of the hardened two-component fastening system.

To overcome these disadvantages of phthalate systems, and especially for arriving at a better mixing ratio between A- and B-components, it has been attempted to substitute the phthalate extender by water. For instance in the hybrid systems as disclosed in DE-4231161-A1, the water is being used to react with a cement added to the A component. In that way the mixing ratio indeed could be decreased to 3:1. However, because water (as compared with phthalates) behaves very different to the diluted resin of the A-component with regard to its solution and wetting behaviour, mixing of the A- and B-components still is very complicated. Another disadvantage of said approach is that it requires an exact stoichiometrical amount of water in the B-component and of cement in the A-component. Additionally, because water freezes at 0° C.; storage and handling of such two-component systems at temperatures below 5–10° C. becomes critical. In order to solve the latter problem, it has been attempted, as disclosed in WO 94/19397, to use epoxy or isocyanate monomers as reactive extenders for the peroxides in the B-component. A major disadvantage of all such approaches so far, however, is that an exact stoichiometrical amount is required of the amino or alcoholic monomer to be added to the resin component (A-component) of the two-component system as a reaction partner for the epoxy or isocyanate monomer.

The aim of the present invention therefore was to provide improved two-component chemical fastening systems comprising a first component ("A-component") containing a diluted resin and an accelerator and a second component ("B-component") containing a peroxide and an extender for the peroxide, which do not have the above disadvantages and can be used in a broad range of mixing ratios of these components Surprisingly it has been found that this aim is achieved in that the extender for the peroxide in the B-component is either a monomeric component containing one or more vinyl ether group(s) and having a structure according to formula 1

$$(A-CH=CH-O)_n-R \qquad \text{(formula 1)}$$

where

A represents hydrogen or an alkyl group with 1–3 C atoms, and where, if there is more than one A, the individual A groups may be the same or different R either represents an aliphatic group, optionally branched, with 1–20 C atoms, which may also contain a cyclohexyl or a 1,4-dimethylenecyclohexyl group and in the carbon chain optionally also one or more O and/or S atoms, which group may be substituted with one or more functional group chosen from either a hydroxyl group or an amino group, optionally substituted with one or two alkyl groups with 1–3 C atoms, or represents a polyethylene glycol or a polypropylene glycol with an average chain length of between 2 and 120 glycol units, optionally with an aliphatic group with 1–5 C atoms attached to the chain's free hydroxyl group and n is 1, 2, 3 or 4, or is a suitable resinous compound comprising, in a covalently built-in manner, a component containing one or more vinyl ether group(s), and the content of peroxide in the B-component is from 0.5 to 99 wt. %.

As meant herein, in the B-component the sum of the content of peroxide and of the content of the component containing one or more vinyl ether group(s) may add up to 100%. However, this sum also may be smaller than 100% in case further components—for instance thixotropic additives, wetting agents, or other components for fine-tuning of the properties of the peroxide composition—are present in said B-component.

The formula 1 monomeric components with one or more vinyl ether group(s) which suitably can be used as an extender in the present invention are commercially available. The following compounds are examples of monomeric vinyl ethers which are very suitable for use in the two-component chemical fastening systems according to the invention: 3-aminopropyl vinyl ether, t-amyl vinyl ether, butyl vinyl ether, cyclohexanedimethanol monovinyl ether, cyclohexyl vinyl ether, 3-diethylaminopropyl vinyl ether, diethylene glycol monovinyl ether, dodecyl vinyl ether, ethylene glycol butyl vinyl ether, ethylene glycol monovinyl ether, 2-ethylhexyl vinyl ether, ethyl vinyl ether, hexanediol monovinyl ether, hydroxybutyl vinyl ether, methyl vinyl ether, octadecyl vinyl ether, polyethylene glycol or polypropylene glycol methyl vinyl ether (varying average molecular weights of the polyethylene glycol are possible, e.g. (only shown for PEG's, but PPG's are similar) PEG-5000, PEG-1500, PEG-1100, PEG-520, PEG-400, PEG-300 or PEG-250; instead of methyl also other lower alkyl ($C_2$ to $C_6$) groups, or a second vinyl group may be present), triethylene glycol methyl vinyl ether; butanediol divinyl ether, cyclohexanedimethanol divinyl ether, diethylene glycol divinyl ether, dipropylene glycol divinyl ether, ethylene glycol divinyl ether, hexanediol divinyl ether, neopentyl glycol divinyl ether, tetraethylene glycol divinyl ether, triethylene glycol divinyl ether, trimethylolpropane trivinyl ether, tripropylene glycol divinyl ether, pentaerythritol tetravinyl ether.

Preferably, the extender is a vinyl ether monomer are selected from the group of mono- or divinyl ether monomers, for instance: butanediol divinyl ether, butyl vinyl ether, cyclohexanedimethanol divinyl ether, cyclohexanedimethanol monovinyl ether, diethylene glycol divinyl ether, ethylene glycol divinyl ether, 2-ethylhexyl divinyl ether, ethyl vinyl ether, hexanediol divinyl ether, hydroxybutyl vinyl ether, methyl vinyl ether, triethylene glycol divinyl ether, and triethylene glycol methyl vinyl ether.

Most preferably, the vinyl ether is selected from the group of hydroxybutyl vinyl ether (HBUVE), diethylene glycol divinyl ether (DEGDVE) or triethylene glycol divinyl ether (TEGDVE).

In one of the preferred embodiment of the invention the monomeric vinyl ether component is a polyglycol vinyl ether. Examples of components belonging to this class have been mentioned before, e.g. polyethyleneglycol or polypropylene glycol methyl vinyl ether. The molecular weights of the polyethylene or polypropylene glycols may vary within a wide range, e.g. (only shown for PEG's, but PPG's are similar): PEG-500, PEG-1500, PEG-1100, PEG-520, PEG-400, PEG-300 or PEG-250. Instead of the methyl ether group also other lower alkyl ($C_2$ to $C_6$) ether groups, or a second vinyl group may be present. This class of polyglycol vinyl ethers is especially advantageous because they can be applied as extender in aqueous dispersions of peroxides. Applicants have observed that the stability of such aqueous dispersions is clearly better than in corresponding non-aqueous systems.

Instead of monomeric vinyl ethers as an extender for the peroxide in the B-component also suitable resinous compounds may be used comprising, in a covalently built-in manner, a component containing one or more vinyl ether group(s). The resinous compounds, which can be used suitably in the present invention, preferably are resinous compounds with one or more vinyl ether group(s) obtained by reaction of a mixture of appropriate amounts of:

a) a first compound (the HVE-compound) containing at least one hydroxyl group and at least one vinyl ether group, and b) a second compound (the D/HIC-compound), being a diisocyanate (or higher isocyanate), reacting with formation of one or more urethane group(s), and c) a third compound (the G/P/HP-compound) chosen from the groups of (1) $C_{2-6}$ glycols, (2) $C_{5-20}$ polyols having 2-5 hydroxyl groups and (3) saturated or (ethylenically) unsaturated hydroxyl terminated polyester compounds, not being alkyd resins, having 1-5 free hydroxyl groups and from 2–50 monomeric ester units (the G/P/HP-compound), or mixtures thereof, the content of vinyl ether groups in the resinous compound being from 0.5 to 50 wt. %, calculated as the weight percentage of the HVE-compound relative to the total weight of said resin component.

All those compounds according to formula 1, which contain at least one hydroxyl group, are suitable as HVE-compounds, with the proviso, however, that if—in compounds according to formula 1—R represents a polyethylene or polypropylene glycol with an average chain length of between 2 and 120 glycol units, then no aliphatic group with 1–5 C atoms is attached to the chain's free hydroxyl group.

Examples of HVE-compounds in the resinous compound with covalently built-in vinyl ether groups, which suitably can be used as diluent for peroxides are hydroxy vinyl ethers or amino vinyl ethers: 3-aminopropyl vinyl ether, cyclohexanedimethanol monovinyl ether, diethylene glycol monovinyl ether, ethylene glycol monovinyl ether, hexanediol monovinyl ether, hydroxybutyl vinyl ether.

Preferably, the HVE-compound is a selected from the group of hydroxy monovinyl ethers, for instance: cyclohexanedimethanol monovinyl ether, hydroxybutyl vinyl ether. Most preferably, the vinyl ether monomer is hydroxybutyl vinyl ether (HBUVE)

The molecular weight of the vinyl ether monomers usually will be in the range of from 70 to 1000; the molecular weight of the vinyl ether group(s) containing components where the vinyl ether group(s) is/are covalently built-in into a suitable resinous compound will usually be in the range of 500 to 5000; such components having a molecular weight lower, respectively higher than 1500 also may be called oligomers, respectively polymers.

The diisocyanate or higher isocyanate (D/HIC) compound as used in the context of the present invention may be any (linear, branched or cyclic) aliphatic and/or aromatic diisocyanate or higher isocyanate, or prepolymers thereof. Specifically suitable D/HIC compounds are, for instance, toluene diisocyanate (TDI), diphenylmethane diisocyanate (MDI), hexane diisocyanate (HDI), isophoron diisocyanate (IPDI) and isocyanurates.

The G/P/HP-compounds as used in the context of the present invention can suitably be chosen from the groups of (1) $C_{2-6}$ glycols, (2) $C_{5-20}$ polyols having 2–5 hydroxyl groups and (3) saturated or (ethylenically) unsaturated hydroxyl terminated polyester compounds, not being alkyd resins, having 1–5 free hydroxyl groups and from 2–50 monomeric ester units. Suitable glycols, for instance, are (mono-, di- or tri-) ethylene glycol or propylene glycol, 1,4-butanediol, 1,6-hexanediol, 1,4-cyclohexanediol. Suitable $C_{5-20}$ polyols having 2–5 hydroxyl groups, for instance, are pentaerythritol, neopentyl glycol, glycerol, trimethylolpropane, hexanetriol, bisphenol-A and ethoxylated derivatives thereof, sorbitol, 1,4-cyclohexane dimethanol, 1,2-bis (hydroxyethyl)cyclohexane. Suitable saturated or (ethylenically) unsaturated hydroxyl terminated polyester compounds, for instance, are chosen from the group of dihydroxy(meth)acrylates and other (meth)acrylic esters of alcohols having 1–12 C-atoms, 2,2-dimethyl-3-hydroxypropyl-2,2-dimethyl-3-hydroxypropionate, and so on. Alternatively hydroxyl terminated saturated or unsaturated polyester resins can be used; examples are unsaturated polyester (pre)polymers or oligomers, or mixtures thereof. Also mixtures of any of the compounds belonging to the group of G/P/HP-compounds can suitably be used.

The molar ratio of (HVE-compound): (D/HIC-compound): (G/P/HP-compound) as used in the context of the present invention is chosen to be approximately 2:2:1. By reacting the HVE-, D/HIC- and G/P/HP-compounds in about said ratio resins are obtained containing at least one vinyl ether group and at least two urethane groups.

In a preferred embodiment of the present invention, the resinous compound with one or more vinyl ether group(s) is obtained from a reaction mixture wherein the first component is formed by a mixture of an HVE-compound and a hydroxylated (meth)acrylate (HA) compound. Suitable HA-compounds as can be used in the present invention are hydroxyethyl acrylate (HEA), hydroxyethyl methacrylate (HEMA) and hydroxypropyl methacrylate (HPMA).

For the reactions between the HVE-compound (and optionally the HA-compound), the D/HIC-compound and the G/P/HP-compound as necessary for the structural incorporation of the component with one or more vinyl ether group(s) into the resin, reaction conditions can be used as are well-known to the skilled man from the synthesis of vinyl ester resins or vinyl ester urethane resins, hereinafter referred to. Examples of suitable methods are described in the experimental part hereof. In addition reference is made to general literature such as "Chemistry and Technology of Isocyanates", H. Ulrich, Wiley & Sons, ISBN 0-471-96371-2, pages 347–403.

The components containing one or more vinyl ether group(s) used according to the present invention as a carrier for the peroxide (polymerization initiator) also may be mixtures of the monomeric vinyl ethers of formula 1 and/or components containing one or more vinyl ether group(s) being covalently built-in into a suitable resinous compound.

It is noticed, that vinyl ether group(s) containing compounds may have a tendency to undergo some polymerization reactions under acidic conditions. For that reason it is preferred, that all components for preparing the peroxide compositions according to the invention are selected in such way that the generation of an acidic medium is prevented.

The reactive extender as used in the two-component chemical fastening systems according to the invention, especially when it has been obtained as indicated in the above reaction of HVE-, D/HIC- and G/P/HP-compounds, may additionally be modified by insertion of one or more additional substituent groups for influencing the solubility of the peroxide in the peroxide composition and/or in the final application thereof.

The resin compositions as used in the A-component usually contain an unsaturated prepolymer, e.g. an unsaturated polyester, a vinyl ester or a vinyl ester urethane or mixtures thereof. These prepolymers usually have an average molar weight of 250 to 5000 g/mole; preferably 500 to 3500 g/mole. Such unsaturated prepolymers and their preparation are commonly known. See e.g. G. Pritchard (Ed.), Development in Reinforced Plastics-1 (1980), Applied Science Publishers Ltd., London, pp. 64–67 (unsaturated polyesters) and pp. 29–58 (vinyl esters); U.S. Pat. No. 3,876,726 (vinyl ester urethanes).

The B-component of the two-component system for chemical fastening according to the present invention may be prepared well in advance of the mixing with the A-component. In such case the A- and B-components can be made available in separate cartridges and are injected simultaneously into, for instance, a drilling hole and an anchor bolt or the like is pressed into said mixed mass (or the mass is pressed around such anchor bolt, etc.) to achieve the chemical fastening.

In addition to the unsaturated prepolymer in the A-component of the two-component chemical fastening system according to the invention, the A-component may also contain one or more of the other monomers commonly used in resin compositions. The most common of such other monomers are styrene and (meth)acrylates (acrylic or methacrylic (hydroxy) esters of alcohols having 1 to 12 C atoms). Other suitable monomers are monomers from the group of compounds that can react with the ethylenic unsaturation of the unsaturated prepolymer. Examples of such other monomers are vinylaromatic compounds, vinyl esters and vinyl nitriles. For instance, vinyl acetate, vinyl propionate, vinyl versatate, alpha-methyl styrene, p-methyl styrene, vinyl toluene, and many others. It is, in the context of the present invention, also possible to use other monomers having more than one unsaturation, for example butanediol di(meth) acrylate, divinyl benzene, diallyl phthalate, triallyl cyanurate or the diallyl and triallyl ethers of trimethylol propane.

The two-component chemical fastening systems according to the invention are usually cured, after mixing of the A- and B-components, with the aid of a peroxide (radical-forming system) that is unstable in a broad temperature range from $-80°$ C. to $+180$, preferably from $-20$ to $+110°$ C. In the context of the present invention, however, such curing also may be carried out at higher temperature, for instance by hot-curing in the range of 110 to 180° C.

"Radical-forming system" is here understood to be a compound (in the B-component) that can act as a radical former, optionally in combination with an accelerator (in the A-component) and/or heat, up to temperature levels in the range of 110 to 180° C. It is of course also possible to use mixtures of radical-forming compounds and/or accelerators, respectively in the B- and A-components.

The peroxides, which can be used as the radical former in the peroxide compositions according to the present invention, may be selected from a wide range of peroxides. Most of these peroxides are commercially available. Preferably, the peroxide is selected from the group of acetylacetone peroxide, cyclohexanone peroxide, methylethylketone peroxide, dibenzoyl peroxide, alkylperoxides, all classes of hydroperoxides, percarbonates, perketals and inorganic peroxides. Apart from the ones already specifically mentioned before, examples of suitable peroxides are diacetyl peroxide, di-p-chlorobenzoyl peroxide, di-t-butyl peroxide, cumene hydroperoxide, phthaloyl peroxide, succinyl peroxide, dilauryl peroxide, acetylcyclohexanesulphonyl peroxide, t-butyl perbenzoate or t-butyl peroctoate, cyclohexane percarbonate, bis-(4-t-butylcyclohexyl) percarbonate, silicium peroxides, etc. Most preferred peroxides are the peroxides from the group of acetylacetone peroxide, cyclohexanone peroxide, methylethylketone peroxide and dibenzoyl peroxide. As meant herein, azo compounds as may be used instead of the peroxides, and are intended to be comprised within the meaning of the term "peroxides".

Preferably, the peroxides (in the B-component) are being initiated by an accelerator. Suitable accelerators (as will usually be present in the A-component and are well-known to the skilled man) are, for example, tertiary amines and/or metal salts, which—if they are present at all—can be present in the A-component in relatively small amounts, preferably in weight amounts of 0.01 to 10, preferably of 0.2 to 5, wt. % of the total weight of the A- and B-components. Suitable metal salts are, for example, cobalt octoate or cobalt naphthenoate; and vanadium, potassium, calcium, copper, manganese or zirconium carboxylates. Suitable amines are, for example, aniline derivatives and N,N-bisalkylaryl amines, such as N,N-dimethyl aniline, N,N-diethyl aniline, N,N-dimethyl p-toluidine, N,N-bis(hydroxyalkyl) aryl amine, N,N-bis(2-hydroxyethyl) aniline, N,N-bis(2-hydroxyethyl) toluidine, N,N-bis(2-hydroxypropyl)aniline, N,N-bis(2-hydroxypropyl) toluidine, N,N-bis(3-methacryloyl-2-hydroxypropyl)-p-toluidine, N,N-dibutoxy hydroxypropyl-p-toluidine and 4,4'-bis(dimethylamino)-diphenyl methane.

Accelerators which can also suitably be used are polymeric amines, for example, those obtained in polycondensation of N,N-bis(hydroxyalkyl) anilines with dicarboxylic acids or polyaddition of ethylene oxide to these amines.

The ratio between the amounts of peroxide and of extender in the B-component may be varied within a wide range and is not considered to be very critical. Usually the peroxide content in the B-component of the two-component system according to the present invention will be chosen between 0.5 and 99, more preferably between 1.0 and 60, wt. % of the peroxide composition (B-component). The concentration range of the peroxides in the B-components according to the present invention is therefore not very critical in general.

It is to be noticed, however, as the skilled man will be aware, that working with peroxides always should be done (starting with amounts of peroxide of less than 5 g per experiment) while taking appropriate safety precautions because of the strong tendency of such compounds to decompose exothermically. Some peroxides, for instance dibenzoyl peroxide, are known to be highly explosive when fully dissolved; for such types of peroxides suspensions or dispersions should be prepared instead of solutions.

Next to the extender in the B-component such amounts of additional phlegmatizers may be present therein, that the two-component system still can be handled properly in the final mixing of A- and B-components before the curing. Also part of the fillers needed in the final resin composition may be blended in the B-component, provided these fillers are not reactive to the peroxide and/or the vinyl ether group(s) containing extender. By doing so the skilled man will increase the flexibility of working with the two-component system because he will be able to adjust the mixing ratio of the B- and A-components in a wide range, and can easily do so in the range of 1:1 to 1:7 (volume/volume). However, when calculating peroxide content, or content of components containing one or more vinyl ether group(s) as used in the present invention, the weight of fillers usually is not taken into account.

The A-components of the two-component systems according to the invention may also contain reinforcing or functional materials and/or fillers like silica (especially fumed silica), quartz sand and/or flour, hollow and/or solid glass beads, mica, cements, calcium carbonate and/or sulfate, korund, carbides, metal particles, heavy spar, synthetic and/or natural fibres etc. It is also possible that the A-components contain thixotropic agents, such as, for instance, fumed silica, silicic acids, layer silica (e.g. bentone) and/or pigments or colorants. The person skilled in the art will readily be able to determine which of such additional materials could be added to the A-component in order to obtain an even better result in fastening.

In a preferred embodiment of the present invention, a vinyl ether component belonging to the same class as the vinyl ether reactive extender in the B-component, is also present in the A-component. This ensures even better mixing of the A- and B-components. Moreover, this offers additional opportunities to the skilled man for adjusting the mixing ratio of the B- and A-components, most preferably in the range of 1:1 to 1:3 (volume/volume). It is most preferred, that the extender used in the B-component and the diluent used in the A-component are the same.

In the two-component-system according to the invention, the ratio between the B-component (comprising the initiator and the extender) and the A-component is preferably in the range of 1:1 to 1:7 (volume/volume). Preferably this ratio is in the range of 1:1 to 1:3 (volume/volume). As has been mentioned before, each of the A- and B-components as such also may consist of more than one spatially separated component, and the B-component may be prepared in situ or already be preformulated.

It may be advantageous, that the two-component systems according to the invention also, in one or both of the components, contain one or more other resin(s) functioning as a binder The invention further relates to methods for preparing such two-component chemical fastening systems, and to the use of such two-component systems for chemical fastening.

In the method for preparing two-component chemical fastening systems according to the invention the B-component is prepared by blending of an organic or inorganic peroxide with a reactive extender selected from the group of monomeric components containing one or more vinyl ether group(s) and having a structure according to formula 1, $(A-CH=CH-O)_n-R$ (as has been further described hereinabove), or of resinous compounds with one or more (covalently built-in) vinyl ether group(s) obtained by reaction of a mixture of appropriate amounts of a) an HVE-compound, b) a D/HIC-compound and c) a G/P/HP-compound (as indicated in more detail hereinabove). The A-component is prepared in any method known to the man skilled in the art.

According to the present invention in particular the following aspects are improved as compared with the prior art two-component systems for chemical fastening:

(1) improved flowing properties of the B-component;
(2) the mixing ratio of A- and B-components can be varied in a wide range;
(3) the extender used in the B-component in chemically incorporated into the final hardened chemical fastening compound after mixing of A- and B-components.

The two-component systems for chemical fastening according to the invention are very suitable for heavy-duty applications of fastening of construction elements in mineral and/or wooden based materials, as will be demonstrated below in the experimental part, e.g. by the excellent values of pull-out strength and curing times. In particular, the two-component system according to the invention is used for chemical fastening by appropriate mixing of the A- and B-components and curing of unsaturated polyester resins, vinyl ester resins, vinylurethane resins or hybrid resins from the A-component.

It is finally noticed, that DE-3940138-A1 discloses, also for use in fastening, curable resin compositions based on an unsaturated polyester and a compound that can polymerize therewith, thereby completely or partly replacing styrene. In particular various esters with one or more cycloaliphatic residual groups containing unsaturations must, however, be present to obtain a good result. Although said reference mentions, that such residual group may also be present in a molecule that also contains an allyl or vinyl ether group, the use of vinyl ethers as an extender for peroxides is not suggested.

The invention will now be illustrated by means of the following examples and comparative examples, which by no means are intended to limit the scope of the invention in any way.

All examples (and comparative examples) were carried out by premixing of the ingredients for each of the A- and B-components and adjusting the temperature of the A- and B-components to the temperature where the tests are being performed. Mixing of the A- and B-components then was done in a static mixer, thereby obtaining the curing mortars for testing both in the laboratory, respectively with anchor bolts inserted therein in the technical area.

General

DSC tests: The rest enthalpy (J/g) of cured material, an adequate indication for the degree of conversion, was calculated from results of Differential Scanning Calorimetry (Mettler, TOLEDO™ DSC 821, STAR system). The samples used were cast between 1-mm rims and mylar foil, and were cured with the curing system as indicated in the tables below. The heating profile for the dynamic run (25° C. to 200° C.) was 10° C./min. Integration of the peaks gives the amount of energy (in mjoules), which after dividing by the sample weight (in mg) gives the rest enthalpy (Rest ΔH in J/g). (according to DIN 16945).

Assessments of properties of the resins were done by determining one or more of the following parameters, using techniques according to DIN 16945. Gelation time was measured by stirring the mortar until a significant increase of viscosity occurred, and surface cure was assessed by estimating the tackiness of the surface after one day of curing Fail load: for measuring the fail load, the most important criterion in chemical fastening techniques, rock-bolts of hardened steel (class 10.9; 12 mm in diameter) were set in concrete (C20/25; bore-holes of 14 mm diameter, setting depth 130 mm). After one day at the given temperature the anchors were pulled out using a hydraulic tool while registering the required force for pulling-out the anchor.

The following resins (and comparative resins) were used in the examples (and comparative examples):

Vinyl Ester Urethane Resin A:

500 g of MDI was added to a stirred reactor and was reacted gradually with 134 g of DPG, under the influence of 0.15 wt. % of dibutyltin laurate as catalyst. The temperature was allowed to reach a maximum of 55° C. Then 288 g of HPMA was added gradually and was reacted while the temperature was allowed to reach 99° C. The molar ratio of HPMA:MDI:DPG is 2:2:1. Resin A was so obtained.

Vinyl Ether Urethane Resin B:

500 g of MDI (diphenylmethane diisocyanate) was added to a stirred reactor and was reacted gradually with 134 g of dipropylene glycol (DPG), under the influence of 0.15 wt. % of dibutyltin laurate as catalyst. The temperature was allowed to reach a maximum of 55° C. Then 232 g of hydroxybutyl vinyl ether (HBUVE) was added gradually and was reacted while the temperature was allowed to reach 99° C. Resin B was so obtained. The molar ratio of HBUVE: MDI: DPG is 2:2:1.

The experiments are summarized in the following Tables I, II and III (all amounts being shown as wt. %).

Table I shows the A-components (A1 and A2) as prepared.

Table II shows the B-components (B1 to B5) as prepared.

Table III shows the results of mixing the A- and B-components, in ratios as indicated.

Both, the urethane vinyl ether prepolymer (Resin B) and the vinyl ether monomer containing compositions (A1 and A2) represent compositions in the sense of the invention. The Comparative Examples (according to the prior art do not contain any vinyl ether structures.

From the results in Table III it can be seen clearly that the compositions according to the present invention can be used favourably at low mixing ratios of A- and B-components. The pull-out values measured, especially the high values for the fail-load at low temperatures, are excellent in comparison to those of the prior art two-component systems. Also the decrease of the rest enthalpy values as compared to those obtained with the prior art systems are remarkable. This further evidence to the fact that improved curing occurs and that the resulting mechanical properties are better.

| Abbreviations used: | |
|---|---|
| BDDMA | 1,4-Butanedioldimethacrylate |
| DEGDVE | Diethyleneglycol divinyl ether |
| DIPPT | Diisopropoxy para-toluidine (an amine accelerator) |
| DPG | Dipropylene glycol |
| HBUVE | Hydroxybutyl divinyl ether |
| HPMA | Hydroxypropyl methacrylate |
| Perox 50 | Peroxan BP 50 SE, a product of Pergan, which contains 50 wt. % of dibenzoyl peroxide |
| MDI | Diphenylmethane diisocyanate |
| TEGDVE | Triethyleneglycol divinyl ether |
| Tempol and: | 4-Hydroxy-2,2,6,6-tetramethylpiperidine-N-oxyl (an inhibitor) |
| Gel t | Gelation time: time associated with interval 25–35° C. in minutes (until significant increase of viscosity) |

TABLE I

| | Component A1 | Component A2 |
|---|---|---|
| Resin A | 12.8 | 12.1 |
| BDDMA | 12.8 | 12.1 |
| HPMA | 12.8 | 12.1 |
| DEGDVE | | 2.6 |
| DIPPT | 0.7 | 0.8 |
| Inhibitor | 0.2 | 0.1 |
| Fumed silica | 3.0 | 3.4 |
| Quartz sand | 37.2 | 37.8 |
| Cement | 20.5 | 19.2 |

TABLE II

|  | Component B1 | Component B2 | Component B3 | Component B4 (reference) | Component B5 (reference) |
| --- | --- | --- | --- | --- | --- |
| Adipic acid ester |  |  |  | 50.0 |  |
| Water |  |  |  |  | 35.0 |
| TEGDVE | 30.0 |  |  |  |  |
| DEGDVE |  |  | 31.6 |  |  |
| Resin B |  | 15.0 |  |  |  |
| Perox 50 | 20.0 | 20.0 | 15.0 | 27.5 | 20.0 |
| Tempol | 0.1 | 0.1 | 0.1 | 0.1 |  |
| Fumed silica | 3.0 | 3.0 | 2.3 | 1.5 | 3.0 |
| Quartz sand |  |  | 8.3 |  |  |
| Quartz flour | 47.0 | 47.0 | 35.3 | 21.0 | 38.0 |
| Cement |  |  | 7.5 |  |  |

TABLE III

|  | Example 1 A1:B1 = 3:1 | Example 2 A1:B2 = 3:1 | Example 3 A3:B3 = 2:1 | Comparative Example A A1:B4 = 7:1 | Comparative Example B A1:B5 = 3:1 |
| --- | --- | --- | --- | --- | --- |
| Gel t at 25° C. [min] | 4.1 | 3.2 | 2.8 | 4.8 | 3.9 |
| Rest enthalpy [J/g] | −50 | −46 | −47 | −83 | −78 |
| Fail load at 25° C. [kN] | 88 | 82 | 85 | 85 | 86 |
| Fail load at −5° C. [kN] | 89 | 85 | 93 | 72 | n.d. |
| Fail load at −15° C. [kN] | 63 | 82 | 54 | 32 | n.d. | n.d.: fail load not determined at −5 and −15° C. (Cannot be injected)

Aqueous Peroxide Dispersions

An aqueous dispersion of benzoyl peroxide with PEG-1100 vinyl ether was prepared having the following composition (in wt. %):

| Benzoyl peroxide | 7.49 |
| --- | --- |
| PEG-1100 vinyl ether | 16.85 |
| Water | 13.11 |
| Quartz sand | 58.99 |
| Fumed silica | 3.56 |

The dispersion was stable for at least 8 weeks. It was combined, in mixing ratios of 1:3 and 1:7 (B- vs. A-component) with a conventional, about 20 wt. % cement containing, A-component (without any vinyl ether group(s)) according to DE-4231161-A1. The fail load value determined (at ambient temperature) was found to be very high, at a level of 74 kN, and there was no need for having an equivalent match between the amount of water and the amount of cement.

The invention claimed is:

1. Two-component chemical fastening system comprising a first, "A", component containing a diluted resin and, optionally, an accelerator and a second, "B", component containing a peroxide and an extender for the peroxide, wherein the extender for the peroxide in the B-component is either:

I. a monomeric component containing one or more vinyl ether group(s) and having a structure according to formula 1

(A—CH=CH—O)$_n$—R  (formula 1)

where
   A represents hydrogen or an alkyl group with 1–3 C atoms, and where, if there is more than one A, the individual A groups may be the same or different
   R either represents an aliphatic group, optionally branched, with 1–20 C atoms, which may also contain a cyclohexyl or a 1,4-dimethylenecyclohexyl group and in the carbon chain optionally also one or more O and/or S atoms, which group may be substituted with one or more functional group(s) chosen from either a hydroxyl group or an amino group, optionally substituted with one or two alkyl groups with 1–3 C atoms, or represents a polyethylene glycol or a polypropylene glycol with an average chain length of between 2 and 120 glycol units, optionally with an aliphatic group with 1–5 C atoms attached to the chain's free hydroxyl group; and
   n is , 1, 2, 3or 4, or
   II. is a suitable resinous compound comprising, in a covalently built-in manner, a component containing one or more vinyl ether group(s), and the content of peroxide in the B-component is from 0.5 to 99 wt. %.

2. Two-component chemical fastening system according to claim 1, wherein the monomeric component I containing one or more vinyl ether group(s) is used and is selected from the group of mono-or divinyl ether monomers.

3. Two-component chemical fastening system according to claim 1, wherein the monomeric component I containing one or more vinyl ether group(s) is used and is selected from the group of hydroxybutyl vinyl ether, diethyleneglycol divinyl ether or triethyleneglycol divinyl ether.

4. Two-component chemical fastening system according to claim 1, wherein the resinous compound II comprising, in a covalently built-in manner, a component containing one or more vinyl ether group(s), is used and is obtained by reaction of a mixture of appropriate amounts of:
  a) an HVE compound containing at least one hydroxyl group and at least one vinyl ether group, and
  b) a D/HIC compound, being a diisocyanate or higher isocyanate, reacting with formation of one or more urethane group(s), and
  c) a G/P/HP compound chosen from the groups of (1) $C_{2-6}$ glycols, (2) $C_{5-20}$ polyols having 2–5 hydroxyl groups and (3) saturated or ethylenically unsaturated hydroxyl terminated polyester compounds, not being alkyd resins, having 1–5 free hydroxyl groups and from 2–50 monomeric ester units, or mixtures thereof, the content of vinyl ether groups in the resinous compound being from 0.5 to 50 wt. %, calculated as the weight percentage of the HVE-compound relative to the total weight of said resinous compound.

5. Two-component chemical fastening system according to claim 1, wherein the reactive extender carries one or more additional substituent groups for influencing the solubility of the peroxide in the peroxide composition and/or in the final application thereof.

6. Two-component chemical fastening system according to claim 1, wherein the reactive extender is a mixture of one or more components having one or more vinyl ether group(s).

7. Two-component chemical fastening system according to claim 1, wherein the peroxide is selected from the group of acetylacetone peroxide, cyclohexanone peroxide, methylethylketone peroxide, and di-benzoyl peroxide.

8. Two-component chemical fastening system according to claim 1, wherein the content of peroxide in the B-component is in the range of between 1.0 and 60 wt. %.

9. Two-component chemical fastening system according to claim 1, wherein the ratio between the B-component and the A-component is in the range of 1:1 to 1:7, vol/vol.

10. Two-component chemical fastening system according to claim 1, wherein a vinyl ether component belonging to the same class as the extender for the peroxide in the B-component is also present as a diluent in the A-component.

11. Two-component chemical fastening system according to claim 10, wherein the diluent in the A-component is the same as the vinyl ether component used as the extender for the peroxide in the B-component.

12. Method for preparing a two-component chemical fastening system according to claim 1 comprising said A component containing a diluted resin and, optionally, an accelerator and said B component, wherein the B-component is prepared by blending of an organic or inorganic peroxide with said reactive extender selected from the group of monomeric components containing one or more vinyl ether group(s) and having a structure according to formula 1, or of said suitable resinous compound comprising, in a covalently built-in manner, a component containing one or more vinyl ether group(s), obtained by reaction of a mixture of appropriate amounts of a) an HVE-compound containing at least one hydroxyl group and at least one vinyl ether group, b) a D/HIC-compound being a diisocyanate or higher isocyanate, reacting with formation of one or more urethane group(s) and c) a G/P/HP-compound chosen from the groups of (1) $C_{2-6}$ glycols, (2) $C_{5-20}$ polyols having 2–5 hydroxyl groups and (3) saturated or ethylenically unsaturated hydroxyl terminated polyester compounds, not being alkyd resins, having 1–5 free hydroxyl groups and from 2–50 monomeric ester units or mixtures thereof.

13. A process for chemical fastening of construction elements in mineral and/or wooden based materials which comprises providing a two component chemical fastening system as set forth in claim 1, wherein said A-component comprises an unsaturated polyester resin, vinyl ester resin, vinylurethane resin or hybrid resin, mixing the A- and B-components and curing the resin from the A-component.

14. Two-component chemical fastening system according to claim 1, wherein the ratio between the B-component and the A-component is in the range of 1:1 to 1:3 vol/vol.

15. Two-component chemical fastening system according to claim 1, wherein the monomeric component I is used.

16. Two-component chemical fastening system according to claim 1, wherein the resinous compound II is used.

* * * * *